Patented Feb. 14, 1950

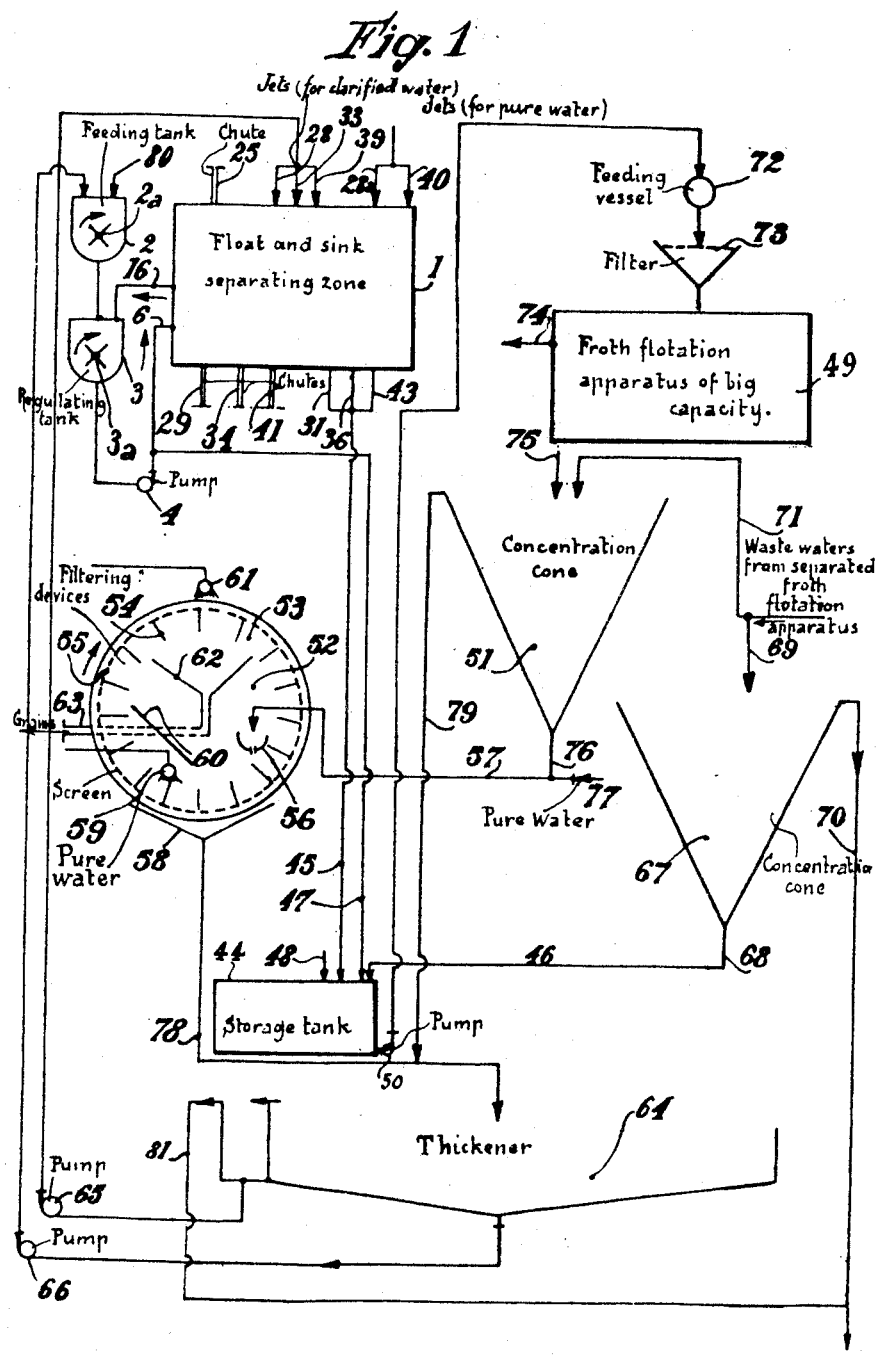

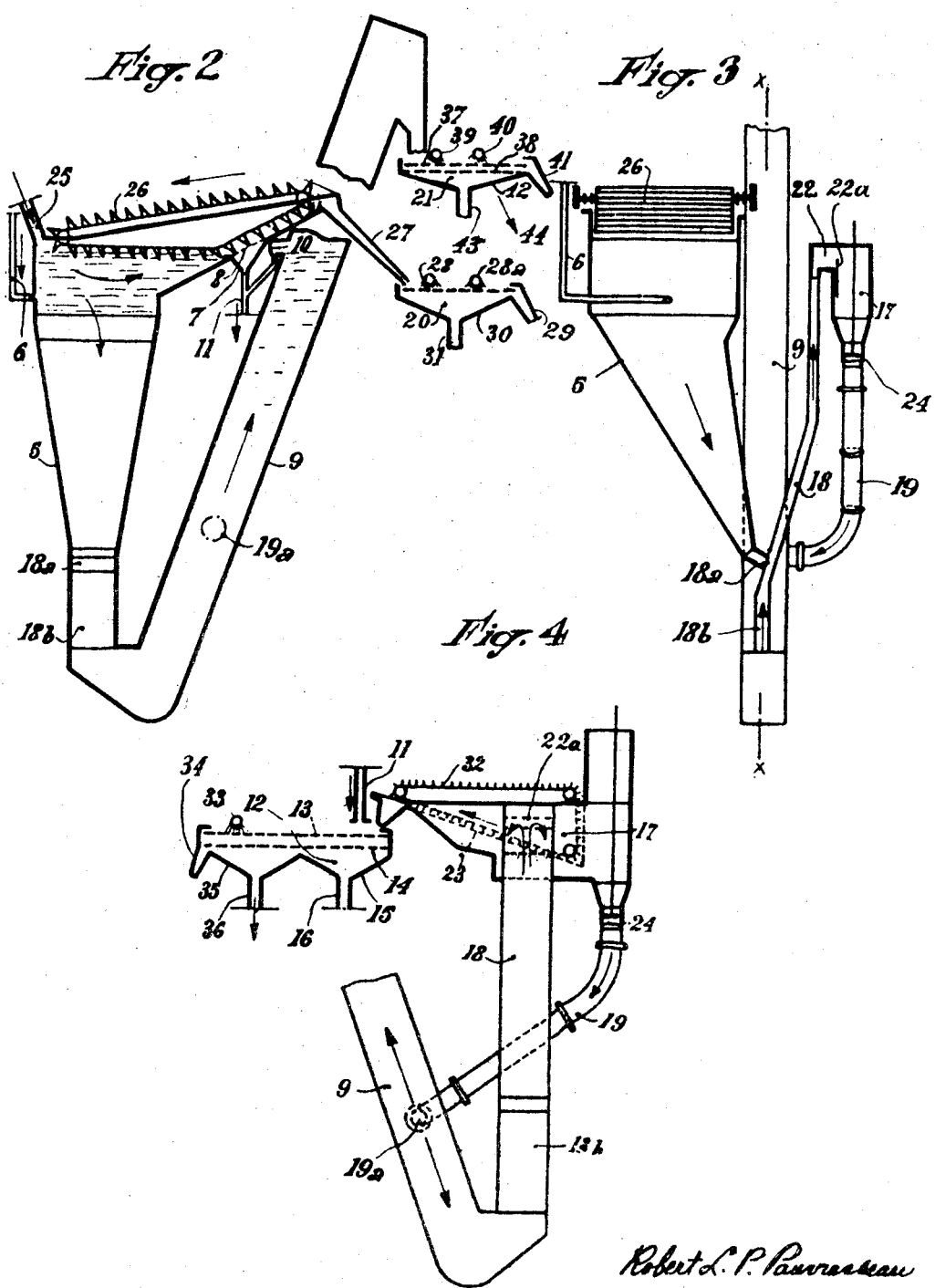

2,497,790

UNITED STATES PATENT OFFICE 2,497,790

SINK AND FLOAT PROCESS FOR THE SEPARATION OF COAL FROM ITS IMPURITIES

Robert L. P. Pauvrasseau, Anzin, France, assignor to Societe Valenciennoise de Gestion (Societe Anonyme), Paris, France, a company of France Application February 25, 1948, Serial No. 10,794
In France November 9, 1943

6 Claims. (Cl. 209—173)

The present application is in part a continuation of my prior co-pending application Ser. No. 609,628, filed on August 8, 1945, now abandoned.

Various methods are already known for the separation of ores from impurities accompanying them and especially for the separation of coal from the shale particles associated therewith, said methods using the difference in specific weight or gravity between the pure coal and the shale for obtaining separation of the components into a floating component and a sinking component through the agency of a vehicle constituted by heavy liquids or by suspensions of solid particles in a liquid.

The suspensions used in various known methods are constituted by fine particles of heavy solid material held in suspension in water, the specific weight of the suspension being adjusted to a value such that one of the components of the raw products to be separated will rise to the surface of the bath while the other components sink to the bottom of the vessel inside which the operation is being executed. The specific gravity of the vehicle may be adjusted by controlling the percentage of solid material held in suspension and by selecting for such substances those having a suitable specific gravity.

In such a quiescent suspension, the solid particles have a tendency to concentrate all the more speedily at the lower part of the vessel containing it as the particles are larger and the specific gravity of the material forming them is higher.

When the speed of concentration is a very low one, the continuous admission of the fresh suspension into the separating apparatus, destined to replace the suspension that is carried along through contact with the coal or ore on one hand and with the tailings on the other, is sufficient for maintaining a constant specific gravity of the suspension in all parts of the apparatus, which specific gravity does not change with time. Such a suspension is generally called a stable suspension and will be termed so in the present specification.

When the case is otherwise, the suspension is termed an unstable suspension. In using such unstable suspensions, it is necessary, in order to obtain a proper washing, for the specific gravity of the suspension at various points of the apparatus, not to vary considerably with time. For reaching such a result, various arrangements have been proposed that may fall in two separate categories:

a. A method wherein a rising current of water is established in the washing vat, which current has a speed sufficient for the solid particles that have a tendency to fall by gravity towards the bottom of the vat to remain suspended in the ascending current; or b. A method according to which the separating liquid is stirred during the separation of the elements to be removed, so as to prevent the particles from settling.

British Patent No. 443,837 to General Electric Co., Ltd., and the U. S. Patents 1,224,138 to T. M. Chance and 2,052,004 to W. L. Remick describe separation methods that make use of unstable suspensions (category $a$), the particles of which are carried along by a rising current of water. In such methods, because the speed of the rising current is adjusted in a manner such that the particles remain in the washing machinery while the water flows out through overflow means, the elements of this suspension separate inside the washing vat and if the water stops flowing, the particles settle almost instantaneously and the apparatus is locked or clogged.

As methods falling under category $b$, I may mention those described in U. S. Patents Nos. 2,113,609 and 2,151,175 in the name of C. E. Wuensch, and No. 1,656,271 in the name of C. R. Downs et al., wherein the solid particles are held in suspension either through compressed air or through mechanical stirrers. In this case also, when the stirring ceases, the particles collect at the bottom of the washing vat and the apparatus is clogged.

In the case of unstable suspensions appearing in the execution of a method of either $a$ or $b$ category, it is possible to keep the specific gravity at a value that does not vary too much with time at each point of the apparatus, but at any given moment, the specific gravity of this suspension is not the same at all points. This variation in specific gravity between one point and another and the stirring of the vehicle act detrimentally on the accuracy of the separation of the compounds in the case of the washing of raw coal, for instance, the washed coal containing a certain proportion of tailings. When it is desired to obtain for the washed coal a predetermined average ash content the efficiency is much less than the theoretical efficiency produced by the curve of possible washing. This difference between theoretical efficiency and practical efficiency is on the contrary almost zero, when the separating suspension used is a stable one.

On the other hand, experience shows that the speed with which the compounds of the raw coal or ore separate in the suspension is all the more reduced when the viscosity of said suspension is greater. The lower the speed, the larger the size of the washing vats should be in order to provide a predetermined output with an accuracy of separation that is satisfactory, and in order for the separation between the floating and the sinking components to be obtained economically while remaining accurate, it is necessary for the viscosity of the suspension not to be too high. One is thus led to use for the constitution of a stable suspension, products that have a high specific gravity and that are crushed to a sufficient fineness for them to remain in suspension in water without any further contrivance, or else products that may be held in suspension through the agency of other substances so as to provide in both cases a suspension of suitable specific gravity together with a comparatively low viscosity.

However, the stability of a suspension requires that the solid substance used may be constituted by particles that are all the smaller when the specific gravity is higher. This leads, when the specific gravity is about 3, to degrees of fineness that it is practically impossible to obtain through crushing.

Thus the magnetites, used in a known method, the specific gravity of which ranges between 4.8 and 5.2 even when finely crushed (so as to pass entirely through a sieve of 300 meshes per linear inch, which produces a maximum size of 0.05 mm.), sink in the water instantaneously to the bottom of the receiver as soon as the stirring ceases.

The suspension in such a method is held in equilibrium by means of rapid horizontal streams which on the other hand reduce the accuracy of the separation; the suspension obtained is thus an unstable suspension.

Galena, as used in the Wuensch method (U. S. Patent 2,151,175), has a specific gravity of 7.4 to 7.6 and when crushed as described above, sinks instantaneously to the bottom of the receiver as soon as the stirring ceases. According to said method, the suspension is held in equilibrium through the agency of a vertical stirrer. Nevertheless its specific gravity is higher in the lower portion of the washing vat than in its upper portion. It thus also forms an unstable suspension.

Baryta sulphate, as used in the de Vooys method (U. S. Patent 2,026,343) the specific gravity of which ranges between 4 and 4.2, when crushed under the same conditions described above, also falls instantaneously to the bottom of the receiver as soon as the stirring ceases.

The suspension in said method is held in equilibrium by reason of the presence inside the suspension of an amount of clay that includes high contents of colloidal material to an amount substantially equal to the weight of the baryta sulphate, said colloidal elements exerting a stabilising action on the particles of the latter. No current or stirring is required for holding said suspension in equilibrium; it forms a stable suspension and the accuracy of separation is perfect.

The suspension used in said de Vooys method includes as chief components a mixture of clay with baryta sulphate which I will term merely baryta, said mixture being associated with fine particles of pure coal introduced in the form of dust accompanying the raw coal or appearing as a consequence of the slight breakage of the coal in the washing apparatus, said pure coal particles being referred to as "coal fines" in this application. In a washing vat in full operation, the amount of coal fines is substantially equal to the weight of baryta.

The de Vooys method consists in introducing raw coal, washing it slightly underneath the free surface of a stable suspension containing substantially equal weights of coal fines, baryta and clay particles, the ratio of the total weight of said particles to the weight of water being such that the specific gravity of the suspension liquid may correspond to the specific gravity for which it is desired to provide the separation between the pure coal and the tailings, and introducing the suspension at a suitable density underneath the level of introduction of the coal into the washing vat in sufficient amounts for producing in said vat a very slow rising current and a very slow downward current having respective speeds of about 0.3 mm. per second and of about 1 mm. per second, said currents allow reducing the size of the vat separating the components of coal, while preventing the pure products, the specific gravity of which approximates the density of the suspension, from standing too long a time in the vat.

The choice of baryta is a judicious one, as said product has a specific gravity ranging between 4 and 4.2 and it may be easily crushed so as to produce the fine particles of 0.05 mm. Such particles may be used without any rapid wear of the equipment through which the suspension moves, which would be the case if sand or siliceous products were used. The use of baryta involves, however, a drawback, in that this material is an expensive product which must be transported to the plant and in spite of the possible recovery methods, there is always a loss of baryta that is serious when the size of the raw coal to be washed is small. This makes the method generally costly and even of a prohibitive price when the size of the raw coal to be washed is less than 5 mm. Furthermore, this method becomes impossible at sites lacking transportation.

It is a primary object of my invention to reduce to a very low value the amount of baryta in the separating liquid, and even to avoid entirely the use of baryta.

According to this invention, I provide an aqueous stable suspension mainly containing a mixture of shale contained in the raw coal and coal fines, together with a very small proportion of baryta (baryta may even be omitted), the proportions and granular composition of solid materials in the suspended mixture being so predetermined that the specific gravity of the suspension may be equal to the specific gravity at which the separation should be executed, so that the pure coal obtained may have the average ash content that it is desired to obtain while the viscosity of suspension should not be too considerable. In other words, the suspension without baryta should behave in the washing apparatus in the same manner as the suspension according to de Vooys method that includes a high proportion of baryta.

The word "shale" in this specification and claims is meant to designate siliceous grains, pyrites, calcite, which may be found in heavy suspension, as well as clayey components or shale proper.

Baryta is a material procurable with difficulty and, in any case, a costly one. Any reduction in the percentage of said substance necessary for compounding heavy liquid, thus results in valuable savings, so much the more as in order to secure a like average specific gravity, tailings, i. e., a material provided by the ore itself is substituted for baryta. Thus the supply of raw material is a reliable one whatever the circumstances may be.

In order to carry out my improved method, taking as a basis the above patented de Vooys method, I may proceed with the two following main steps:

1. I permanently and energetically remove the coal fines which have a tendency to gather in the suspension by transferring into a froth flotation vessel the whole amount of diluted suspension from the step of rinsing washed coal, middlings or intermediate products and shale, before treating said suspension in the filtrating apparatus, and forwarding the same to thickeners for the purpose of re-building a heavy suspension.

2. I continuously add solid material having a suitable specific gravity for replacing all or part of the baryta; said addition my advantageously be constituted by comminuted shale which may be introduced at any point in the cycles.

In the known process described in U. S. Patent 2,026,343 the average specific gravity of suspended solid materials comprising baryta, clay and coal fines, is in the neighborhood of 2.34. Hence, I may obtain a like specific gravity without adding baryta, solely by using shale having a specific gravity of about 2.9 and coal fines having a specific gravity of about 1.45, provided that the coal fines content in the suspended solid material is sufficiently low, to wit about 24 percent for a size of coal to be washed ranging between 30 and 120 mm.

Before continuing the description of the method, it is necessary to define certain data concerning the suspension used that forms the basis of the present invention.

*Composition of the suspension*

The heavy suspension includes solid particles and water. As concerns the nature of the material forming same, there are two sorts of particles:

1. Particles of shale, the origin of which is as follows:

a. Shale particles that are pre-existent in the raw coal out of the mine and that are not removed when removing the dust before washing by reason of the imperfect operation of all dust-removing apparatus;

b. The breaking and the disintegration of shale contained in the raw coal submitted to washing, said breaking and disintegration being however inconsiderable; and c. The incorporation of shale particles obtained through crushing of part of the shale obtained through the separation or else produced in an auxiliary plant for the flotation of the slimes or coal dust.

To these particles of an actual shale character are generally admixed small amounts of material of siliceous, pyritic and calcareous character having the same origin as the shale particles and falling into the general category of material termed shale as defined hereinabove.

The proportion in weight of such siliceous, pyritic and calcareous particles depends on the origin of the raw coal treated in the plant. With reference to the particles termed hereinabove shale, it may range between 0 and 10% but it may reach 30% without this forming any drawback for the method.

The specific gravity of the shale particles ranges between 2 for certain calcareous elements and 4 for certain pyritic elements, the average specific gravity being of a magnitude of 2.9.

2. Coal particles due to:

a. Particles pre-existent in the raw coal as it comes out of the mine and that remain in the raw coal submitted to washing by reason of the imperfect character of the dust-removing means operating before the washing;

b. The somewhat inconsiderable breakage of the pure coal contained in the raw coal submitted to washing; and c. Shale particles added for regenerating the suspension as certain shales when submitted to crushing contain still a certain proportion of coal particles. The shale particles fed by the auxiliary plant for the flotation of the tailings or coal washings also contain such particles.

In plants provided with dust-removing means that operate normally and when treating raw coal the moisture contents of which reach on the average 4%, the incorporation of coal particles from the two first-mentioned sources $a$ and $b$, is of the magnitude of 0.3% for coal gauging between 30 and 120 mm. and of the magnitude of 1% for coal gauging between 5 and 10 mm.

The specific gravity of the coal particles depends on the nature of the raw coal submitted to washing. It is lower for fat coal for which it is about 1.35, than for anthracite for which it is 1.5. It is of about 1.45 for anthracitous coal.

The heavy suspension is formed by a mixture of both kinds of particles with water. The coal and shale particles form with water a suspension that is stable without any stirring being required.

*Specific gravity of the suspension*

The specific gravity of the suspension depends on the total weight and total volume of the solid particles contained per unit of volume.

If $w$ is the average specific gravity of the particles, the volume expressed in litres of a weight $P$ of solid particles is equal to $P/w$. If one litre of the suspension contains a weight $P$ of solid particles, the available volume left for water expressed in litres is equal to $1-P/w$, with the obvious supposition that $P$ is smaller than $w$ and the weight of this water expressed in kilograms is also equal to $1-P/w$.

Consequently the specific gravity of the suspension is given by the Formula 1, $D=P+1-P/w$.

With particles of a predetermined average specific gravity it is possible to obtain an extensive range of specific gravities by providing a more or less considerable weight of particles per unit capacity of suspension. Of course, it is not possible to rise beyond the value $D=w$ as at this moment there would be no room left for the water.

In practice, the thickeners used for recovering the solid particles carried along by the rinsing waters provide a suspension with a specific gravity above 1.6 and it is sufficient to dilute it more or less in order to obtain a suitable specific gravity for the suspension as comprised between 1.35 and 1.6 or thereabouts according to the nature of the raw coal to be washed.

The suitable specific gravity depends on the average ash content defined by commercial circumstances for the washed coal and on the curve of possibilities of washing of the raw coal submitted to washing.

Thus for providing an average ash content in the pure coal that is equal to 6%, the specific gravity of the suspension should have a certain value comprised between 1.45 and 1.6, according to the shape of the said curve of possible washing.

Viscosity of the suspension

Experience shows that the speed at which the components of the raw coal to be washed (the specific gravity of which being higher than the specific gravity of the suspension) separate out of the pure coal, is slower as the viscosity becomes greater.

The allowable viscosity limit is all the smaller when the size of the coal particles to be washed is smaller. In the apparatus of the de Vooys type that operates with a stable suspension without any baryta in accordance with the present invention, the limit viscosity is of the magnitude of 100 centipoises for coal sizes ranging between 30 and 120 mm. and only of the magnitude of 60 centipoises for sizes comprised between 5 and 10 mm.

Now the viscosity is all the greater when the ratio between the volume available for water and the total volume of the solid particles is smaller.

According to the conventions referred to hereinabove, said ratio $r$ is expressed by the Formula (2) $$r = \frac{1 - P/w}{P/w} = \frac{w}{P} - I$$

and by replacing $P$ by its value given out by the Equation 1, the following formula is obtained (3) $$r = \frac{W - D}{D - I}$$

This shows that for a predetermined specific gravity, $r$ is all the greater when the specific gravity of the particles is also greater. One is led to use particles the average specific gravity of which is as large as possible and consequently to reduce to the utmost the proportion of coal fines. The specific gravity of the shale particles being less than 3, this does not lead to the drawback mentioned hereinabove with reference to the use of solid particles of very high specific gravity.

I have found experimentally the statistical law governing the variations in viscosity in relationship with the ratio $r$, the elements whereof appear in the following table:

Table I

| Value of the ratio $r$ | 1.8 | 1.7 | 1.6 | 1.5 | 1.4 | 1.3 |
|---|---|---|---|---|---|---|
| Viscosity in centipoises | 29 | 36 | 45 | 56 | 70 | 100 |

For values of $r$ underneath 1.3, the viscosity increases at a very high rate. The practical limit of viscosity being about 100 centipoises for the treatment of raw coal having a size ranging between 30 and 120 mm., the limit of the ratio $r$ corresponding thereto is 1.3.

For a specific gravity of suspension of 1.58, the use of which is quite usual for the washing of raw anthracitous coal of said gauge, the application of the Formula 3 shows that the average specific gravity of particles corresponding thereto is equal to 2.34.

The specific gravity of the coal fines being equal to 1.45 and that of the shale particles to 2.9, it will be readily found that the upper limit of the coal fines content of the suspension contained in the washing vat is equal to 24%.

By reason of the incorporation of coal fines provided by the products to be washed that enter the vat, this leads to a limit content of 18% coal fines after reconditioning the suspension.

Of course, it is desirable to provide a coal fines content lower than said figure so as to increase the output of the washing apparatus or for an equal output an increase in the accuracy of the separation.

Granular size of the particles forming the suspension

Above 1 mm. the particles are submitted by reason of the action of their vehicle to a thrust that causes the particles, the specific gravity of which is lower than that of the suspension, to rise to the surface, while those having a higher specific gravity sink to the bottom. The particles whose size is above 1 mm. cannot thus be considered as forming part of the suspension.

I have found that in order to obtain, through the agency of a stable heavy suspension, a separation between floating and settling particles that is as perfect as possible, it is necessary that the range of sizes between the upper size of the suspension particles and the size of the smallest particles submitted to Archimedes thrust should include, if not an extended gap, at least a subrange for which the percentage of solid particles is very small. Experiments made have proved that this sub-range may be advantageously defined between sizes of 0.2 and 1 mm. and that a very satisfactory separation may be obtained when the suspension does not contain more than 5% in weight of particles lying within said range.

On the other hand, the viscosity that, as disclosed hereinabove, depends on the ratio between the volume of water and the total amount of particles, depends also on the fineness of said particles. Comparing, for instance, a suspension made with predetermined particles and a predetermined amount of water with another suspension made with the same volume of particles of same kind, but smaller and with the same volume of water, the second suspension will, it is true, show exactly the same specific weight as the first one, but its viscosity will be greater.

In order that this viscosity may not be too high, it is necessary to hold underneath 30% the proportion in weight of extra fine particles, i. e., the size of which is less than 0.006 mm.

A second reason for this limitation is due to the fact that the speed of settling of the solid material in the thickening vessels is reduced when the proportion of extra-fine particles is large so that it is necessary to provide thickening vats of considerable capacity.

The following table gives out the granulometric composition of the system of particles comprised between 0 and 1 mm., taking into account the fact that the particles comprised between 0.2 and 1 mm. cannot be considered as forming part of the suspension. The percentages given out in said tabulae are considered as percentages in weight and are valid both for coal fines and for shale particles.

Table II

| Size of Particles | Optimum Proportion | Limits not to be Exceeded |
|---|---|---|
| | Percent | |
| 0 to 0.006 mm | 20 | Max. 30%, Min. 10%. |
| 0.006 mm. to 0.1 mm | 60 | Max. 90%, Min. 40%. |
| 0.1 mm. to 0.2 mm | 15 | Max. 20%, Min. 0. |
| 0.2 mm. to 1 mm | 5 | Max. 10%, Min. 0. |

I have found that the weight of particles comprised between 0.006 mm. and 0.1 mm. on one hand and the weight of particles comprised between 0.1 and 0.2 mm. on the other hand appear normally in a ratio as of 60 versus 15 in the particles from the sources already mentioned. The obtention of the granual proportions disclosed will consist therefore in adjusting solely the proportions of the extra-fine particles and of the particles of a size comprised between 0.1 mm. and 0.2 mm. in a manner described hereinafter.

The above values have been obtained through measurements executed with conventional sieves for particles above 0.1 mm., the operation being performed by spraying the sieve with water. Underneath 0.1 mm. I have used for finding the magnitude of the particles their speed limit of fall in stationary water as a very diluted liquor, and I have applied the Stokes formula that allows calculating the radius of the particles when the specific gravity of the material forming same is ascertained. This formula is a follows:

$$W = \frac{2}{9} g \frac{\delta - 1}{\eta} r^2$$

wherein [1]
$w$ is the limit speed of fall
$r$ the radius of particle
$g = 981$
$\eta = 0.0115$ viscosity of the water
$\delta =$ the specific weight of the particle

[1] These values given out in C. G. S.

The characteristics of the stable suspension according to my invention appear in the following Table III; the figures given out relate to the separation of an anthracitous coal, the sizes ranging respectively between 30 and 120 mm., 10 and 30 mm., and 5 and 10 mm., being treated separately, each in a washing vat treating 100 tons per hour.

The average ash content of the washed material as defined by commercial requirements is 6% and the curves of possible washing special to each category show that the specific gravity for which the separation between the washed coal and the tailings should be made is 1.58 for the 30 to 120 mm. sizes, 1.57 for the 10 to 30 mm. sizes and 1.55 for the 5 to 10 mm. sizes.

furthermore about 2 tons of shale particles from the additional material used for making up for losses and out of which said apparatus is to remove about 0.2 ton of coal fines. The total mass of 24.5 tons is diluted in a volume of 120 cubic meters. The flotation apparatus should have a considerable capacity if it is desired to keep for said suspension a viscosity low enough to obtain an accurate separation.

The above table also shows that it is absolutely necessary to submit to flotation the totality of the diluted suspension formed through the rinsing, failing which it would be necessary to obtain at the outlet of the flotation apparatus coal fines content too small for it to be possible to obtain in any apparatus even with a very high consumption of reagents. Thus, for instance, if it were desired to extract a tonnage of 1.9 tons of coal fines per hour while submitting to flotation only two thirds of the recovered diluted suspension, the coal fines content to be obtained at the outlet of the flotation apparatus should be reduced to 12.70% of the total found in the suspension. This much extraction would be very difficult to obtain and would lead to an important expenditure in reagents.

In order to provide, according to my invention, for intensive removal of coal fines, I may add to the diluted suspension from the step of rinsing washed coal, middlings and shale before froth flotation, a portion of heavy suspension in operation in washing vessels, before sending the same to filtering and concentrating devices, this portion being all the more considerable when the coal fines content in the washing vat is lower.

By removing coal fines as explained, the concentrated suspension withdrawn from thickening devices and forwarded to coal washing vessels keeps a considerably lower coal fines concentration, for instance lower by one quarter to one half, than that which the heavy suspension used for washing should eventually have. Thus the coal fines supply from raw coal in washing vessels is compensated for, and the coal fines content in the washing suspension does not increase beyond the desired value.

Continuous supply of solid material is made by

*Table III*

| | 30 to 120 | 10 to 30 | 5 to 10 |
|---|---|---|---|
| Average ash contents of the washed coal per cent | | | 6 |
| Average specific gravity of the coal fines | | | 1.45 |
| Average specific gravity of the shale particles | | | 2.90 |
| Size of the raw coal to be treated mm | 30 to 120 | 10 to 30 | 5 to 10 |
| Output of raw coal to be treated tons/hour | 100 | 100 | 100 |
| Specific weight of the suspension | 1.58 | 1.57 | 1.55 |
| Limit viscosity of the suspension centipoises | 100 | 90 | 60 |
| Minimum value of the ratio between the volume of water and the volume of particles of the suspension | 1.30 | 1.31 | 1.47 |
| Minimum value of the average specific weight of the suspension particles | 2.34 | 2.32 | 2.36 |
| Maximum coal fines content of the particles of suspension in the washing tank per cent | 24 | 25 | 23 |
| Addition of coal fines in percentage of the raw coal treated per cent | 0.3 | 0.6 | 1 |
| Hourly output per ton of coal fines to be removed through flotation tons per hour | 0.3 | 0.6 | 1 |
| Volume of the suspension carried along by the products and recovered by rinsing m.³-hour | 4 | 7 | 12 |
| Weight of solid particles per litre of suspension gr | 1,013 | 1,002 | 954 |
| Weight of shale particles per litre gr | 770 | 751 | 735 |
| Weight of coal fines per litre gr | 243 | 251 | 219 |
| Maximum coal fines content of the suspension, recovered through rinsing and purified per cent | 17.9 | 18.0 | 15.6 |

The above table shows that the amount of coal fines to be removed which is equal to 1.9 tons per hour, is dispersed in a mass of solid particles which is very important as it reaches 22.5 tons for the system of 3 tanks. These 1.9 tons of coal fines to be eliminated correspond to 35.5% of the total coal fines contained in the 22.5 tons of particles. The flotation apparatus receives introducing crushed shale, which is obtained advantageously from raw coal treated in the washing plant, preferably into the feeding tank containing the concentrated suspension withdrawn from the thickeners, in the case of dry crushed shale, or into the collecting tank which receives diluted suspension from the step of rinsing washed coal, middlings and shale before its being forwarded to the sink and float process, when dealing with moist crushed shale.

Where the washing plant is provided with means for froth flotation slimes or coal dusts, the whole crushed shale or part thereof may be replaced advantageously by fine particles of shale obtained upon froth flotation of such slimes or coal dusts, as the latter shale particles are valuable in their already having the desired particle size, and in needing no crushing. For introducing such shale particles from the slime or coal dust flotation step into the heavy liquid washing cycle, it is preferable to supply the froth flotation apparatus for the diluted suspension with diluted suspension together with waste waters issuing from the froth flotation apparatus for slimes and coal dust after preconcentration, if need be, of said shale-containing waters in suitable apparatuses in order to avoid useless introduction of water into the cycle, and to add only useful materials, to wit shale.

Certain of the methods already mentioned make use of a flotation apparatus for removing out of the circuit a part of the coal contained in the suspension but in such methods that make use of an unstable suspension, said extraction has by no means the same object as in applicant's case, which is a limitation of the percentage of coal fines forming one of the components of the stable washing suspension to a value such that the viscosity of the suspension may not be too large. On the contrary, said extraction as provided in known prior methods has for its object the recovery of the fine coal particles that are carried along and have a commercial value, as disclosed in the Wuensch Patent 2,151,175, or else as disclosed in the Downs Patent 1,656,271. Again, such prior methods provide for the formation of the unstable suspension with the fine particles carried along by the washed coal and containing consequently a high percentage of coal fines whereas the particles carried along by the tailings are returned directly to the washing vat. In the method according to the invention, not only all the rinsing waters obtained starting from either the coal, the middlings or the shale, are sent to the flotation apparatus, but in addition thereto, a part of the suspension in the washing vat may be removed and sent into the flotation extraction apparatus so as to reduce considerably the coal fines content of the suspension which is returned into the washing apparatus.

My invention will now be described as applied to part of an ore washing and extracting plant, particularly a plant for separating coal from its impurities, which enables carrying out the improvement above described.

In such a plant, grains of raw coal having a size of 5 to 50 mm. are treated with heavy liquid of the above type; for greater convenience, the grains are classified into three size types: 5 to 10 mm., 10 to 30 mm., and 30 to 50 mm. Such sizes and classification are not limitative, as my invention is useful with any kind of coal capable of being treated by means of heavy liquid, whatever may be their grain size and granular composition.

The following description with reference to the appended drawings, given solely by way of example, will show how this invention may be carried out:

Fig. 1 is a diagrammatic view showing a plant for washing and extracting coal, according to my invention;

Fig. 2 is a simplified elevational view with parts in section, along line X—X on Fig. 3, showing a washing or separating vessel of the de Vooys type with rinsing apparatus for pure coal and shale respectively;

Fig. 3 is an end view of the same vessel, with a portion of the apparatus for separating middlings; and Fig. 4 is an elevation with a partial section taken along line X—X on Fig. 4, viewed from the right, diagrammatically showing the middlings vessel and the apparatus for rinsing middlings.

Before describing the complete plant for executing my invention, the washing apparatus illustrated in Figs. 2 to 4, will be described.

The washing vessel (Fig. 2) comprises a container 5 in the form of an inverted frustum of a pyramid, which communicates through its bottom part with a bucket conveyor 9. For the sake of simplicity, I have omitted the buckets in the showing and illustrated solely the casing in which said buckets travel.

A second vessel 17, the so-called middlings vessel, communicates on the one hand with the bottom part of the container 5 at 18a through a pipe 18 of rectangular cross-section, which branches off from the base of container 5, and on the other hand with the bottom part of bucket conveyor casing 9 through a pipe 19 opening at 19a in said casing.

The three rinsing appliances are screen 20 for washed coal, screen 12 for middlings and screen 21 for shale.

The heavy suspension in the regulating tank 3 (Fig. 1) is forced continuously by means of a pump 4 into a washing vat or vessel 5 where it is admitted through pipe 6.

A part of said suspension forms an upflow the velocity of which is much slower than the sinking speed of the heavier components of the coal and progresses over a weir or over-flow 7 at a higher level than the outlet of pipe 6, after passing through a grate 8 adapted to retain the coal grains in the suspension. It falls from overflow 7 into a collecting pipe 11.

The remainder of the suspension forms a downflow also having a very low speed, although somewhat faster than that of the upflow; it then rises in the casing of bucket conveyor 9, passes over weir 10 and meets in collecting pipe 11 that portion that forms the upflow.

The purpose of these up and down flows is to prevent products having a specific gravity approximating that of the suspension, from staying for too long a time in vessel 5 as this would be detrimental to proper operation of said vessel.

The speed of the upward stream is of the magnitude of 0.3 mm. per second and that of the downward stream is of the magnitude of 1 mm. per second whereby the two streams exert no objectionable action on the accuracy of the separation which is obtained in practice solely through a difference in specific gravity.

It is not necessary to describe now in detail the operation of the vats and it is sufficient to state that the heavy suspension flowing through the pipe 11 of the washing vat is sent on to the rinsing apparatus for the middlings 12 (Fig. 4) which apparatus is provided with a grid 13 and a metal gauze 14 holding up the small granules of solid material carried along after which said suspension is returned to the adjusting container through the pipe 16.

This first circulation is completed by a stream produced in the line 18, the upper end of which opens into the middlings tank 17 through an overflow 22 located underneath the level reached by the heavy suspension in the vat 5 and the casing 9 of the bucket elevator, which level is defined by the location of the overflow levels 7 and 10. The stream of heavy suspension thus established in the line 18 carries the middlings along into the vat 17 from which they are extracted by the scraper chain 32. They drip off first on the grid 13 while the heavy suspension flows into the hopper 15 to return into the washing vat through the pipe 16. They are then washed with clarified water from the thickeners 64 through a perforated spraying pipe 33. The diluted suspension obtained through this washing flows out through the pipe 36.

The pure coal extracted from the vat 5 by the rake band 26 is drained over the grid 8 and washed then over the screen 20 through the agency of a perforated spraying tube 28 fed with clarified water and then with pure water by means of the perforated spraying tube 28a. These rinsing operations produce a diluted suspension containing fine particles of pure coal passing through the grid of the screen 20 after which it is collected in the hopper 30 and removed through the pipe 31.

Similarly, the shale washed on the screen 21 is rinsed first with clarified water and then with pure water by means of perforated spraying tubes 39 and 40 and the diluted suspenion obtained through this rinsing and containing fine particles that have passed through the metal gauze 38 is removed through the hopper 42 and the pipe 43.

The three washed products are removed out of the apparatus respectively at 29 for the coal, at 34 for the middlings, at 41 for the tailings.

For the system of three sizes of washed grains ranging respectively between 5 and 10 mm., 10 and 30 mm., 30 and 50 mm., the plant for practicing my invention includes (Fig. 1): a pipe 45 for collecting the three diluted suspensions leaving at 31, 36 and 43, the screening devices on which washed coal, middlings and shale are rinsed;

A storage tank 44 into which flows the resulting diluted suspension through pipe 45;

A pipe 47 through which a portion of heavy suspension from the delivery side of pumps 4 can be sent to storage tank 44 if desired;

A pipe 48 through which shale wet-crushed in a separate plant (not shown) can be introduced into tank 44 if desired;

A vessel having a plurality of froth flotation cells, diagrammatically illustrating by rectangle 49, supplied by a pump 50 which is under a head from storage tank 44; said vessel having a sufficient capacity for the treatment of the totality of the diluted suspension collected in tank 44 and a removal made from the heavy suspension contained in the washing vat 5; and A concentration cone 51 for classifying according to the size solid particles contained in diluted suspension after flotation.

When an auxiliary flotation apparatus is available for the treatment of slimes and coal dust, the plant may include moreover a pipe 46 leading to the tank 44, the waste waters containing fine particles of shale passing out of said auxiliary flotation apparatus, which waste waters may be concentrated inside a concentration cone 67 for collecting at the tip 68 of said cone a liquid with high contents of solid material adapted for use.

In the method according to invention, the washing in vats 5 and 17 and the rinsing of the products obtained in the screens 20. 12 and 21 is performed exactly in the same manner as with the de Vooys method of which the present invention forms an improvement except for the fact that the stable suspension in said vats contains no baryta, said suspension being obtained solely starting from shale and containing only a weight of coal fines the proportion of which is less than 24%.

The suspension may possibly contain a small proportion of baryta, that is less than 10% in weight in case of a temporary partial faulty operation of the flotation apparatus.

In the present example, froth flotation apparatus for slimes and coal dusts (not shown on the drawings) are available in a proximate plant. Waste waters containing particles of shale as obtained from said froth flotation ("waste waters" for short) are concentrated beforehand in a cone 67 into which they are delivered through a pipe 69. As the lower part of the cone is a calibrated nozzle 68 of suitable diameter, which discharges a liquid having a high shale content that is sent to storage tank 44 through a pipe 46. Those waters with a low solid content which flow over the top of said cone are removed from the washing plant through a pipe 70. The purpose of such a concentration is to enable introducing into tank 44 an amount of shale particles sufficient to maintain optimum specific gravity after subsequent passage of the suspension through thickeners 64 without it being necessary to send too much water, which would uselessly overload the cycle.

Alternatively, those waste waters may be introduced into the diluted suspension cycle at a point other than storage tank 44; in particular they may be supplied through pipe 71 to concentration cone 51 which will be hereinafter described.

Liquids from storage tank 44 that receives all the diluted suspensions are forced through a pump 50 into feeding vessel 72 for froth flotation machine 49, which is one of large size. Before being admitted to machine 49, the liquids pass through a filter fabric 73 adapted to retain coarser coal particles, which by reason of their size could not be carried along with the flotation froths and also coarser particles of shale and middlings, in order to rough out the duty imposed on the main filtering devices 52.

The flotation vessel 49, which is of the "mineral separation" type or of any other known type capable of eliminating as far as possible the fine coal particles, is adapted to carry along coal fines in froths to an extent such that the coal fines content in the suspension subsequently concentrated in thickeners 64 and delivered to washing vats 5 is reduced for instance by one quarter or one half with reference to the coal fines content finally to be obtained for the heavy suspension employed as a washing medium. Consequently, continuous coal fines supply from raw coal to the tanks is compensated for, and the coal fines content in the washing suspension does not increase beyond the desired figure.

Flotation vessel 49 yields froths loaded with coal fines that are led out of the heavy liquid system through a pipe 74 and produces a diluted suspension freed from the major part of the coal fines. Said diluted suspension should contain then at the utmost 18% in weight of coal fines with reference to the total solid weight in the suspension and it is fed through pipe 75 to concentration cone 51 wherein solids are classified in accordance with their sizes. In said cone, the liquid is split into two streams; one of them, which flows over the top and contains no particle likely to be retained on filtering devices 52 located ahead, is directly forwarded to thickeners 64 through pipe 79; the other stream that flows from the bottom of the cone through a calibrated nozzle 76 having a suitable diameter contains the remainder of the solid particles. It is sent through pipe 57 into a plurality of Callow sizing trommels 52 arranged in parallel relationship, and is carried along by a stream of pure water from the water tower through a pipe 77. The pure water supply makes easier the movement of said concentrated liquid, its distribution between the filtering devices, and the very filtering operation. The Callow sizing trommels include two sheet metal cheeks 53 interconnected by means of flat irons 54 to form a drum which slowly revolves in the direction shown by an arrow. A wire gauze 55 with very fine meshes is wound over said flat irons and allows the passage only of particles of a size less than 0.2 mm. Within the drum is a trough 56, the bottom part of which is provided with ports to distribute the liquid to be filtered, that is brought from the apex of concentration cone 51 through a pipe 57, the latter trough protruding into the drum through a cheek thereof. Liquid passing through the wire gauze is gathered in hopper 58. Solid particles retained by said gauze are rinsed with pure water supplied from a sprinkling device or jet 59. They are subsequently carried round with the gauze in its rotary movement. What little liquid is carried with the flat irons 54 begins to flow down as soon as the latter are in slanting position towards the drum centre; it is then guided to the lowest point on the gauze over the incline 60 and passes through said gauze, leaving on its way down those particles of larger size than the gauze mesh that it may still carry along. The particles still adhering to the gauze are forced inwardly by pure water from an extraneous sprinkling device or jet 61 and fall into an inner hopper 62. Thence, they are led through pipe 63 out of the heavy liquid washing plant.

It should be remarked that in the plant allowing doing away with the use of baryta, the Callow sizing trommels are no longer required to filter the large amount of coal particles that have been removed through flotation; this improves their efficiency and allows obtaining an optimum composition of the suspension as concerns grain size. In particular, the Callow sizing trommels never overflow which allows limiting to a very small value the proportion of particles, the size of which ranges between 0.2 and 1 mm., which has a considerable importance for the accuracy of separation as disclosed precedingly.

Filtered liquid collected in hopper 58 is sent to thickeners 64 through pipe 78. It contains only solid particles of a size less than the mesh of Callow sizing trommels gauze.

By reason of pure water being introduced through sprinkling devices 28a, 40 and 59 and through pipe 77, an excess of clarified water prevails; it is conveyed from thickeners 64 out of the washing plant through pipe 81. The removal is necessary to prevent the aqueous suspension in the system from growing richer in too fine solid particles and in order to adjust the proportion of extra fine particles contained in the suspension to the optimum value above defined, the output of pure water is suitably adjusted.

The thickeners 64, which are of any desired number and operate in parallel relationship, deliver from their apices a heavy suspension having a specific gravity larger than that of the washing suspension used in the washing vessel or vat 5. The thickened suspension is sent by pumps 66 to regulating reservoirs 2 and 3 wherein it acts to adjust the specific gravity of the washing suspension, and compensate for egress of said suspension out of vat 5 due to its being carried along with washed coal, middlings and shale.

When by reason of an imperfect removal of dust from the grains to be washed by the heavy suspension, the coal fines content can not be kept at a proper value solely by the above process, a certain amount of heavy suspension is also subjected to froth flotation, preferably in the same vessel 49 interposed in the main cycle of the diluted operative suspension. Said amount of heavy suspension is withdrawn from the continuous cycle formed by washing vat 5, vessel 3 and pump 4; it is sent through pipe 47 into the storage tank 44 where it is admixed before flotation with the diluted suspension obtained from the rinsing steps.

Where a slime and coal-dust flotation plant is not available, a supply of heavy particles of shale is made at 80 in feed vessel 2, in the form of dry crushed shale, or at another point, for instance at 48 in storage tank 44 in the form of wet crushed shale.

The necessity of concentrating the diluted suspension and of keeping the viscosity of the heavy suspension at the desired value requires, as disclosed, for the percentage of extra fine particles having a size less than 0.006 mm. not to exceed the values shown in Table I. The percentage of said particles may be easily ascertained by measuring their limit speed of fall in quiescent water, said speed limit for the size considered underneath 0.006 mm. corresponding to a drop of 5 mm. in three minutes. This measure may be performed easily by pouring into a suitably sized receiver a suspension of low concentration containing at a maximum 70 grams of solid material per litre and causing a part of the liquid poured into it to flow out after a predetermined time interval through a side port provided in the receiver, said liquid carrying along with it the particles which have not yet had time to settle. By adding to the liquid remaining in the receiver pure water and renewing the operation a certain number of times (in practice 6 operations are sufficient, which is proved by the fact that the liquid extracted through the last operation is practically pure water), all the extra fine particles are carried along to the outside and this allows ascertaining their percentage in the suspension that is being investigated by weighing the residual matter obtained by evaporating on one hand the liquid remaining in the apparatus after the last operation and on the other hand the various liquids extracted.

What I claim is:

1. A float-and-sink process for the separation of impurities from coal, said coal having a minimum size of approximately 5 mm., comprising the steps of introducing said materials into a suspension containing particles of coal shale and coal fines in water, the average specific gravity of said shale particles and said coal fines being approximately 2.34, the maximum proportion by weight of coal fines to the total weight of solid materials being approximately 24 per cent, the particles of shale and coal fines together having no particles to exceed 1 mm. in size, with a maximum percentage of 10 per cent by weight for particles of sizes between 0.2 mm. and 1 mm., a maximum percentage of 20 per cent by weight for particles of sizes between 0.1 mm. and 0.2 mm., a maximum percentage of 90 per cent by weight for particles of sizes between 0.006 mm. and 0.1 mm., and a maximum percentage of 30 per cent and a minimum of 10 per cent by weight for particles smaller than 0.006 mm., and separately withdrawing the products of the separation.

2. A float-and-sink process for the separation of impurities from coal, said coal having a minimum size of approximately 5 mm., comprising the steps of introducing said materials into a suspension containing particles of coal shale and coal fines in water, the average specific gravity of said shale particles and said coal fines being approximately 2.34, the maximum proportion by weight of coal fines to the total weight of solid materials being approximately 24 per cent, the particles of shale and coal fines together having size limits and weight proportions as follows: 0–10 per cent of particles between 0.2 mm. and 1 mm., 0–20 per cent of particles between 0.1 mm. and 0.2 mm., 40–90 per cent of particles having sizes between 0.006 mm. and 0.1 mm., and 10–30 per cent of particles having sizes less than 0.006 mm., and separately withdrawing the products of the separation.

3. A float-and-sink process for the separation of impurities from coal, said coal having a minimum size of approximately 5 mm., comprising the steps of introducing said materials into a suspension containing particles of coal shale and coal fines in water the average specific gravity of said shale particles and said cole fines being approximately 2.34, the maximum proportion by weight of coal fines to the total weight of solid materials being approximately 24 per cent, the particles of shale and coal fines together having no particles to exceed 1 mm. in size, with an optimum percentage of 5 per cent by weight for particles of sizes between 0.2 mm. and 1.0 mm., an optimum percentage of 15 per cent by weight for particles of sizes between 0.1 mm. and 0.2 mm., an optimum percentage of 60 per cent by weight for particles of sizes between 0.006 mm. and 0.1 mm., and an optimum percentage of 20 per cent for particles of sizes less than 0.006 mm., and separately withdrawing the products of the separation.

4. A float-and-sink process for the separation of impurities from coal, said coal having a minimum size of approximately 5 mm., comprising the steps of introducing said materials into a suspension containing particles composed of coal shale, barytes and coal fines in water, the average specific gravity of said particles being approximately 2.34 the maximum proportion by weight of coal fines to the total weight of solid materials being approximately 24 per cent, the maximum proportion by weight of barytes to shale particles and coal fines being 10 per cent, the particles of shale, barytes and coal fines together having no particles to exceed 1 mm. in size, with a maximum percentage of 10 per cent by weight for particles of sizes between 0.2 mm. and 1.0 mm., a maximum percentage of 20 per cent by weight for particles of sizes between 0.1 mm. and 0.2 mm., a maximum percentage of 90 per cent by weight for particles of sizes between 0.006 mm. and 0.1 mm., and a maximum percentage of 30 per cent and a minimum of 10 per cent for particles of sizes less than 0.006 mm., and separately withdrawing the products of the separation.

5. The process according to claim 1, including the additional steps of continuously removing a portion of the suspension in which the original coal fines content has been raised above 24 per cent by reason of coal fines derived from the coal itself, and continuously adding to the suspension particles of shale and coal fines in such proportion less than the said 24 per cent necessary to keep the suspension in substantial equilibrium respecting the particle weight proportion of coal fines at 24 per cent in the separating zone.

6. The process according to claim 1, including the additional steps of continuously removing a portion of the suspension in which the original coal fines content has been raised above 24 per cent by reason of coal fines derived from the coal itself, said suspension also having acquired larger solid particles of coal, submitting said portion to froth flotation and removing at least one fourth of the total coal fines content, filtering said portion to remove particles having a size larger than approximately 0.2 mm., removing from said portion a percentage of particles of size less than 0.006 mm. to reduce said percentage to less than 30 per cent, adding to said portion an amount of coal shale sufficient to replace the particles removed, readjusting said portion to the proper specific gravity of approximately 2.34, and returning said portion to said suspension.

ROBERT L. P. PAUVRASSEAU.

REFERENCES CITED

The following references are of record in the file of this patent:

UNITED STATES PATENTS

| Number | Name | Date |
|---|---|---|
| 1,224,138 | Chance | May 1, 1917 |
| 1,290,516 | Conklin | Jan. 7, 1919 |
| 1,656,271 | Downs | Jan. 17, 1928 |
| 1,895,505 | Wuensch | Jan. 31, 1933 |
| 2,026,343 | De Vooys | Dec. 31, 1935 |
| 2,052,004 | Rewich | Aug. 25, 1936 |
| 2,113,609 | Wuensch | Apr. 12, 1938 |
| 2,151,175 | Wuensch | Mar. 21, 1939 |
| 2,190,637 | Rakowsky et al. | Feb. 13, 1940 |
| 2,341,247 | Trostler | Feb. 8, 1944 |

FOREIGN PATENTS

| Number | Country | Date |
|---|---|---|
| 443,837 | Great Britain | Mar. 2, 1936 |
| 473,973 | Great Britain | Oct. 22, 1937 |
| 547,099 | Great Britain | Aug. 13, 1942 |

OTHER REFERENCES

Verdinne: "The New Coal Washing Processes Employing Suspensions of Dense Media," Colliery Guardian, Nov. 24, 1939, vol. CLIX, pages 743, 749.